(12) United States Patent
Riedel

(10) Patent No.: US 12,220,368 B2
(45) Date of Patent: Feb. 11, 2025

(54) ROBOT STRUCTURE AND REHABILITATION DEVICE

(71) Applicant: KUKA Deutschland GmbH, Augsburg (DE)

(72) Inventor: Martin Riedel, Augsburg (DE)

(73) Assignee: KUKA Deutschland GmbH (DE)

( * ) Notice: Subject to any disclaimer, the term of this patent is extended or adjusted under 35 U.S.C. 154(b) by 944 days.

(21) Appl. No.: 17/294,150

(22) PCT Filed: Nov. 12, 2019

(86) PCT No.: PCT/EP2019/080927
§ 371 (c)(1),
(2) Date: May 14, 2021

(87) PCT Pub. No.: WO2020/099354
PCT Pub. Date: May 22, 2020

(65) Prior Publication Data
US 2022/0015978 A1 Jan. 20, 2022

(30) Foreign Application Priority Data
Nov. 14, 2018 (DE) .................... 10 2018 219 447 .5

(51) Int. Cl.
*A61H 1/02* (2006.01)
*B25J 9/04* (2006.01)

(52) U.S. Cl.
CPC ......... *A61H 1/0277* (2013.01); *A61H 1/0237* (2013.01); *B25J 9/042* (2013.01);
(Continued)

(58) Field of Classification Search
CPC .. A61H 1/0277; A61H 1/0274; A61H 1/0237; A61H 2201/1215;
(Continued)

(56) References Cited

U.S. PATENT DOCUMENTS 1,551,332 A 8/1925 Schramm
4,690,010 A * 9/1987 Matsumoto .............. B25J 9/126
475/179
(Continued)

FOREIGN PATENT DOCUMENTS

EP 2781317 A1 9/2014
JP H0373133 U 7/1991
(Continued)

OTHER PUBLICATIONS

European Patent Office; Search Report in related International Patent Application No. PCT/EP2019/080927 dated Jan. 22, 2020; 2 pages.
(Continued)

*Primary Examiner* — Colin W Stuart
*Assistant Examiner* — Douglas Y Sul
(74) *Attorney, Agent, or Firm* — Dorton & Willis, LLP (57) ABSTRACT

A robot structure and a rehabilitation device have multiple elements and joints connecting the elements. At least one of the elements includes a first tubular piece with a first outer lateral surface wall, and a second tubular piece with a second outer lateral surface wall. The second tubular piece is arranged such that the length thereof is at an angle to the length of the first tubular piece so that the second tubular piece is inserted into two opposing tubular sections of the first tubular piece, and the second tubular piece passes through the first outer lateral surface wall of the first tubular piece at opposite sides. The second tubular piece is rigidly connected to the first tubular piece by a first connection element and a second connection element.

16 Claims, 10 Drawing Sheets

(52) U.S. Cl.
CPC ............ *A61H 2201/1215* (2013.01); *A61H 2201/1638* (2013.01); *A61H 2201/1642* (2013.01)

(58) Field of Classification Search
CPC .... A61H 2201/1638; A61H 2201/1642; A61H 2201/1635; B25J 17/025; B25J 17/0258; B25J 9/042; F16B 7/044; F16B 7/0446; F16B 17/004; A61B 90/50; F16M 11/2014; F16M 11/2092; F16M 11/04; A47B 57/045
USPC ... 403/67, 78, 164, 165, 192, 194, 197, 201, 403/346, 347, 365, 400; 248/274.1, 248/276.1, 282.1, 283.1; 74/490.01
See application file for complete search history.

(56) References Cited

U.S. PATENT DOCUMENTS

| | | | | |
|---|---|---|---|---|
| 4,864,888 A * | 9/1989 | Iwata | ................... | B25J 17/0241 901/23 |
| 6,095,468 A * | 8/2000 | Chirico | ............. | F16M 11/2014 248/125.7 |
| 6,593,718 B1 * | 7/2003 | Yamazoe | ................. | B25J 9/042 318/568.11 |
| 8,196,492 B1 * | 6/2012 | Denu | ....................... | B25J 9/042 414/744.5 |
| 9,076,829 B2 * | 7/2015 | Brodine | ................... | B25J 9/042 |
| 2013/0060171 A1 * | 3/2013 | Fu | ........................... | A61H 1/00 601/5 |
| 2013/0158438 A1 * | 6/2013 | Scott | .................... | A61H 1/0237 600/595 |
| 2016/0000633 A1 * | 1/2016 | An | ....................... | A61H 1/0277 601/33 |

FOREIGN PATENT DOCUMENTS

| | | |
|---|---|---|
| JP | H08290385 A | 11/1996 |
| WO | 2015048688 A1 | 4/2015 |

OTHER PUBLICATIONS

European Patent Office; International Preliminary Report on Patentability in related International Patent Application No. PCT/EP2019/080927, no date shown; 5 pages.

* cited by examiner

ROBOT STRUCTURE AND REHABILITATION DEVICE

CROSS-REFERENCE TO RELATED APPLICATIONS

This application is a national phase application under 35 U.S.C. § 371 of International Patent Application No. PCT/EP2019/080927, filed Nov. 12, 2019 (pending), which claims the benefit of priority to German Patent Application No. DE 10 2018 219 447.5, filed Nov. 14, 2018, the disclosures of which are incorporated by reference herein in their entirety.

TECHNICAL FIELD

The invention relates to a robot structure comprising several links and joints connecting these links to one another, wherein at least one link of said links includes a first tube piece, which comprises a first jacket outer wall and includes a second tube piece, which comprises a second jacket outer wall, wherein the second tube piece is arranged with its longitudinal extent at an angle to the longitudinal extent of the first tube piece in such a way that the second tube piece is inserted into two opposite tube cutouts of the first tube piece, and the second tube piece thereby passes through the first jacket outer wall of the first tube piece at opposite sides, wherein the second tube piece is rigidly connected to the first tube piece by means of a first connection element and a second connection element. The invention furthermore relates to a rehabilitation device having such a robot structure.

BACKGROUND

WO 2015/048688 A1 discloses a rehabilitation device designed for operation in conjunction with one of the limbs of a user, wherein the relevant limb of the user comprises an end point. The rehabilitation device includes a base, a robot arm, which is fastened to the base and comprises an end point, wherein the robot arm comprises at least two active degrees of freedom relative to the base and is configured such that, while the base is suitably positioned relative to a user, the reference frame of the robot is oriented to be substantially similar to the reference frame of the user. The movements of the end point of the relevant limb of the user are mimicked by movements of the end point of the robot arm.

SUMMARY

The object of the invention is to provide a generally applicable robot structure—in particular, a rehabilitation device—which can be operated in a particularly reliable manner despite cost-effective construction.

This object is inventively achieved by a robot structure comprising several links and joints connecting these links to one another, wherein at least one link of said links includes a first tube piece, which comprises a first jacket outer wall and includes a second tube piece, which comprises a second jacket outer wall, wherein the second tube piece is arranged with its longitudinal extent at an angle to the longitudinal extent of the first tube piece in such a way that the second tube piece is inserted into two opposite tube cutouts of the first tube piece, and the second tube piece thereby passes through the first jacket outer wall of the first tube piece at opposite sides, wherein the second tube piece is rigidly connected to the first tube piece by means of a first connection element and a second connection element, and the first connection element comprises for this purpose a first ring section, which, with its first ring inner jacket wall, abuts flush against the second jacket outer wall of the second tube piece and, with its first ring outer jacket wall, abuts flush against a first cutout edge of the one tube cutout of the first tube piece, and the first connection element comprises a tab section, which adjoins the first ring section and extends with its longitudinal extent along the longitudinal extent of the first tube piece while abutting flush against the first jacket outer wall thereof, and the second connection element comprises for this purpose a second ring section, which, with its second ring inner jacket wall, abuts flush against the second jacket outer wall of the second tube piece and, with its second ring outer jacket wall, abuts flush against a second cutout edge of the other tube cutout of the first tube piece, and the second connection element comprises a cylinder jacket section which adjoins the second ring section and abuts flush against an inner wall of the first tube piece.

The robot structure need not necessarily be designed as a rehabilitation device. The inventive robot structure can generally be used in any kinematics having several joints. In particular, the robot structure can be used in all types of robot kinematics known per se, such as industrial robots. Nevertheless, the inventively described robot structure is particularly well-suited in the design as a rehabilitation device.

A robot structure is understood to be a kinematics of a robot arm. The robot structure can, in particular, be formed by a serial arrangement of alternating links and joints. Not all joints of the robot structure necessarily have to be designed as motor-driven joints. For example, one or two joints can be non-driven, i.e., freely-rotatable, wherein the remaining joints of the robot structure are motor-driven. At least one of the several links of the robot structure may be designed inventively. Accordingly, several or even all of the links of the robot structure can be designed inventively.

In principle, the first tube piece and the second tube piece may comprise any desired cross-sectional shape. The first tube piece and/or the second tube piece can preferably comprise a circular cross-sectional contour. The tube cutouts of the cross-sectional contour of the first tube piece and/or of the second tube piece can accordingly be designed to be correspondingly circular.

The tab section of the first connection element may form a projection of the first ring section, which extends in a web-like manner radially away from the first ring section and in parallel to the longitudinal extent of the first tube piece.

The second tube piece can be inserted with its longitudinal extent at a right angle to the longitudinal extent of the first tube piece into the first tube piece so that the second tube piece is arranged perpendicularly to the first tube piece. The longitudinal extent of the first tube piece thus forms a right angle, i.e., an angle of at least approximately or exactly 90 degrees, with the longitudinal extent of the second tube piece.

The first connection element and/or the second connection element can each be designed as a one-piece plastic body—in particular, as a plastic injection-molded body or as a 3-D-printed plastic body. The plastic body can be produced, for example, from polyethylene, polypropylene, or polyamide—in particular, fiber-reinforced polyamide, such as PA-GF.

The first connection element can be connected to the first tube piece in that an inner surface, facing the first tube piece, of the tab section of the first connection element is adhesively bonded or cohesively connected to the first jacket outer wall of the first tube piece.

The second connection element can be connected to the first tube piece in that the cylinder jacket section, facing the first tube piece, of the second connection element is adhesively bonded to the inner wall of the first tube piece.

The first connection element can be connected to the second tube piece in that the first ring inner jacket wall, facing the second tube piece, of the first ring section of the first connection element is adhesively bonded or compression-molded to the second jacket outer wall of the second tube piece.

The second connection element can be connected to the second tube piece in that the second ring inner jacket wall, facing the second tube piece, of the second ring section of the second connection element is adhesively bonded or compression-molded to the second jacket outer wall of the second tube piece.

In all embodiments, the tab section of the first connection element may extend in the longitudinal extent of the first tube piece over a minimum length equal to or greater than the width—in particular, the diameter—of the second tube piece.

In all embodiments, the first tube piece and/or the second tube piece may comprise a circular cross-section, and/or the tab section of the first connection element may extend transversely to the longitudinal extent of the first tube piece over a circumferential arc of the first tube piece, which extends at an angle of between 90 and 180 degrees around the first tube piece.

The first ring section of the first connection element may comprise, at least at the height of the first cutout edge of the one tube cutout, an at least largely constant wall thickness, and the second ring section of the second connection element may comprise, at least at the height of the second cutout edge of the other tube cutout, an at least largely constant wall thickness, each wall thickness being on average between 0.5 and 2.0 millimeters.

The first connection element may comprise a first drive-element seat, and/or the second connection element may comprise a second drive-element seat, each drive-element seat being designed to carry a drive element of the robot structure in a rotationally-fixed manner.

As an alternative or in addition to a drive-element seat, the first connection element may comprise a first rolling bearing seat, and/or the second connection element may comprise a second rolling bearing seat, each rolling bearing seat being designed to carry an inner ring of a rolling bearing of the robot structure in a rotationally-fixed manner.

In its tube wall, the second tube piece may comprise at least one passage opening, which is arranged in the longitudinal extent of the second tube piece at a height located between the first connection element and the second connection element, wherein the passage opening is designed for an electrical line to be passed through between a first cavity of the first tube piece and a second cavity of the second tube piece.

The object is, in particular, achieved by a rehabilitation device comprising a stand; a lifting column fastened to the stand; a lifting carriage mounted in a height-adjustable manner on the lifting column and automatically height-adjustable by means of a first drive of the rehabilitation device; a base arm mounted on the lifting carriage pivotably about a first, vertical axis of rotation and pivotable about the first, vertical axis of rotation in an automatically-driven manner by means of a second drive of the rehabilitation device; a forearm mounted on the base arm pivotably about a second, vertical axis of rotation and pivotable about the second, vertical axis of rotation in an automatically-driven manner by means of a third drive of the rehabilitation device; a connection piece mounted on the forearm freely rotatably about a third, vertical axis of rotation; and a body part support mounted on the connection piece tiltably about a fourth, horizontal axis of rotation, wherein at least the base arm, the forearm, and the connection piece are designed as a robot structure with a link, such as according to one or more of the described embodiments of the inventive robot structure.

The connection piece freely rotatable about a third, vertical axis of rotation on the forearm is thus freely rotatably mounted on the forearm in a non-driven manner.

Each drive of the rehabilitation device can be assigned to a single drivable joint of the rehabilitation device. Each drive may be arranged, for example, in a link directly upstream of the joint to be driven in the kinematic chain or may be arranged in a link directly downstream of the joint to be driven in the kinematic chain. Optionally, two or more drives for different joints may be arranged in the same link. In particular, the lifting carriage may comprise drives both for moving the base arm and for moving the forearm.

All drives can be driven automatically—in particular, driven in a program-controlled manner—by a common control device of the rehabilitation device.

The body part support forms a connection link for coupling the rehabilitation device to a body part of a person to be treated. Coupling can already take place in that the person places one of their body parts, such as the hand, forearm, or leg, on a support surface of the body part support. The body part support may comprise a fastener, such as at least one lashing strap, which is designed to releasably fasten the body part of the person to the body part support.

The body part support can be tiltable about the fourth, horizontal axis of rotation in an automatically-driven manner by means of a fourth drive of the rehabilitation device.

The body part support can be tilted in that a control device of the rehabilitation device controls the fourth drive.

The automatically-driven movement of the body part support relative to the connection piece can be coupled to the automatically-driven vertical movement of the lifting carriage relative to the lifting column.

A coupling of the movement of the body part support relative to the connection piece to the vertical movement of the lifting carriage means that the vertical movement of the lifting carriage forms an input variable for controlling the tilting movement of the body part support. This tilting movement of the body part support may take place synchronously to the vertical movement of the lifting carriage. Alternatively, the tilting movement of the body part support may also take place asynchronously to the vertical movement of the lifting carriage, but as another predetermined function of the vertical movement of the lifting carriage.

The first drive may include a first motor, which is arranged in the stand or in the lifting column and is designed to raise and/or lower the lifting carriage on the lifting column in a motor-driven manner, and the rehabilitation device may in this case comprise a mechanical coupling device, which forms a part of the fourth drive and is designed to transmit a driving movement of the first motor to the body part support in such a way that, during a lifting movement of the lifting carriage, the body part support, driven by the first motor, carries out a tilting movement synchronous to the lifting movement.

The mechanical coupling device can, in particular, be designed to absorb a lifting movement of the lifting carriage and convert the lifting movement into a tilting movement of the body part support. Such a conversion may also include a transmission ratio, implemented, for example, by a transmission.

The first drive can include a first motor, which is arranged in the stand or in the lifting column and is designed to raise and/or lower the lifting carriage on the lifting column in a motor-driven manner, and the fourth drive may in this case comprise a fourth motor, which is designed to transmit its driving movement to the body part support in order to carry out a tilting movement of the body part support, wherein the fourth motor is coupled in terms of control technology to the first motor in such a way that, during a driving movement of the first motor, for moving the lifting carriage relative to the lifting column, a simultaneously-controlled movement of the fourth motor brings about a tilting movement of the body part support synchronous to the lifting movement.

A control-technology coupling of the fourth motor to the first motor can take place, for example, via the control device of the rehabilitation device, which also controls the further drives of the rehabilitation device.

The second drive can generally include a second motor, and the third drive can include a third motor, wherein the first motor, the second motor, and the third motor are controlled by a common control unit of the rehabilitation device in a compliance control—in particular, an impedance control or an admittance control.

A force-controlled and/or moment-controlled operation of the drives or motors, i.e., a compliance control, can take place, for example, by means of impedance control or admittance control. Admittance control is based upon an existing position control of the positions of the rehabilitation device at the joint level of the rehabilitation device. In this case, the generalized forces acting on the rehabilitation device from outside are measured. Based upon these forces, a movement of the rehabilitation device corresponding to the desired dynamic behavior is determined and is commanded of the drives or the motors via inverse kinematics and the subordinate position control. In contrast to an admittance control, an impedance control is based upon an existing torque control at the joint level. The deviation of the actual position from a defined target position is measured, and a desired generalized force, or forces and moments, is determined according to the desired dynamic behavior. This force can be mapped to corresponding joint torques via the known kinematics of the rehabilitation device. The torques can, lastly, be adjusted via the subordinate torque control.

The rehabilitation device is, in particular, a so-called serial kinematics in which the links and the joints of the rehabilitation device are arranged alternately in series, one behind the other.

The second drive can include a second motor, and the third drive can in this case include a third motor, wherein the second motor and the third motor are controlled by a common control unit of the rehabilitation device in a compliance control—in particular, an impedance control or an admittance control—and the first motor is controlled by the control unit in a position-controlled manner.

The forearm can generally be mounted on the base arm pivotally about the second axis of rotation by means of a second joint, wherein the second joint is designed to keep the forearm above the base arm in all pivoting positions of the forearm, and the connection piece is mounted on the forearm pivotably about the third axis of rotation by means of a third joint, wherein the third joint is designed to keep the connection piece above the forearm in all pivoting positions of the connection piece, and the body part support is mounted on the connection piece tiltably about the fourth axis of rotation by means of a fourth joint, wherein the fourth joint is designed to keep the body part support above the forearm in all pivoting positions of the body part support.

An anti-pinch protection can be achieved or improved in that the surfaces of the base arm and the forearm facing one another in a superimposed position of the base arm and the forearm are each covered with an elastic layer.

In all embodiments, the body part support may optionally be designed as an arm support, as a hand support, or as a leg support.

In the following, the invention is once again described in summary, and, if necessary, also expressed in different words.

The object of the invention is to create a novel corner connection for tubular bodies—in particular, for thin-walled, tubular bodies and especially with different outer diameters—which corner connection makes it possible to realize a very simple and at the same time very stiff structure of robot links. The corner connector, i.e., the first connection element and the second connection element, as well as the entire structure design, can be designed to be extremely lightweight. The corner connectors are to occupy as little installation space as possible. In addition, the construction is to be very cost-effective and economical to produce, even in a small quantity. The corner connectors can be constructed, for example, from plastic, which can be injection-molded in high-volume production and can be produced in low volume, e.g., in a 3-D printing process.

Irrespective of the material and production process, the constructed connections shall comprise high stiffness properties.

The corner connector shall, above all, be suitable for use in rehabilitation devices and, in this case, provide new possibilities for realizing stiff and lightweight structures.

The simplest connection of two tubes of different outer diameters is nesting, by fixing the smaller tube in a crosswise hole of the larger tube. If the two tubes have very thin wall thicknesses, such as 1.0-1.5 mm, different requirements result, depending upon the joining method.

In addition to the thin-walled nature, which leads, above all, to challenges during welding or brazing, the resulting small contact surface is disadvantageous with regard to alternatives, such as adhesive bonds or press-fit connections. In addition, depending upon the type of load and the direction of loading, only a small region of the small contact surface transmits the forces and moments, whereby the permissible surface pressure of the thin tubes is quickly exceeded.

Adhesive bonding of the tubes enlarges the force-transmitting surface, since, in this case, tensile forces can also be transmitted, and the pressure regions can be relieved. However, the small contact surface that can be used for the adhesive bonding is also important in this case.

In one embodiment, the force transmission between the tubes should be designed to be as direct as possible, in order to be able to save material, and thus weight. In this case, the tubes are not arranged perpendicularly to one another, but in one another as described above. As a result, the connecting element(s) are not loaded by unfavorable moments, e.g., through bending and/or torsion, and can be made more lightweight and at the same time stiffer.

The inventive connection is constructed, by way of example, as described below.

A first tube piece corresponds to the main support structure of a link. A smaller, second tube piece, which is arranged at an angle—in particular, to be predominantly perpendicular—to the first tube piece, can point in the direction of an axis of rotation of a joint. The second tube piece is firmly connected to the first tube piece and receives the bearings for the joint construction via the jacket surfaces, either on the tube exterior or the tube interior. The connection element is designed in one or more parts—in particular, two parts. In this case, the two connection elements form the connection between the two tubes in that they form wide contact regions, via which forces can be conducted over a large area, both in the upper contact region and in the lower contact region. In this case, a cohesive connection, such as by welding, soldering, adhering, intermolecular joining, etc. —in particular, a large-area adhesive bond—is to be formed between the intermediate elements and the first tube piece, while a press-fit connection and/or an adhesive bond can be formed between the second tube piece and the intermediate elements. The contact surfaces of the intermediate elements to the first tube piece are wide in circumference in order to enlarge the effective adhesive surface and to make it stable for loads in all directions.

Annular sections on the two connection elements ensure the centering to the first tube piece in each case. In this case, the first connection element has a very deep centering, i.e., a first ring section for enlarging the contact surface to the second tube piece. The second connection element has only a very short centering, i.e., a second ring section, which does not substantially enlarge the space requirement of the two tube pieces towards the outside. The centering regions essentially form the shortest distance between the tube pieces, and thus the shortest force flow. Although the force is guided over a large area via the contact surfaces, the centering region continues to be loaded. For reasons of stiffness, a thin-walled centering, in particular, is sought here so that only a small amount of pliable material, such as, in particular, plastic, is located between the stiff metal tubes.

A thicker plastic region is, inventively, disadvantageous, since more material would be present for compression in this case, and this would lead to stronger spring behavior of the link construction.

The first connection element can be lengthened farther to the center of the structure on the upper side in order to enlarge the contact surface and to be able to better absorb tilting loads on the axis of rotation. Especially in the case of a main forward loading direction, i.e., when the subsequent link is loaded downwards, e.g., by weight forces, this additional region contributes to further stiffening and stability of the connection by absorbing tensile forces in the adhesive bond.

In the upper contact region to the second tube piece, the first connection element may comprise further embodiments, such as an axial bearing contact surface for a lower joint bearing, which can be integrated directly into the connection element.

The two connection elements can be completely hollow, open to one side—preferably to a side facing away from the contact surface—and optionally provided with ribs—in particular, with a constant wall thickness. As a result, such connection elements are not only lightweight, but can also be produced very simply and cost-effectively with little material usage, both as an injection-molded part in high-volume production and as a 3-D-printed part in prototype construction or in low-volume production.

For mounting, the second connection element is first inserted slightly higher into the first tube piece, so that it does not collide with the inner jacket surface. For this purpose, recesses and flattened portions can be provided on the second connection element at appropriate points. The second connection element can then be inserted from the inside into the recess for the second tube piece and adhesively bonded accordingly. Thereafter, the first connection element can be placed on the first tube piece in a corresponding manner from outside, and also adhesively bonded. The second tube piece is, lastly, inserted into the first connection element and the second connection element, and is compression-molded and/or adhesively bonded thereto.

The intermediate elements described inventively can be used at all interfaces of two tube pieces in each case, and thus also allow a continuous structure on the basis of very lightweight, thin-walled aluminum tubes.

The invention is self-contained and can be used in many areas of robotics. In the context of a rehabilitation application, the invention can be used particularly advantageously as a structural part of a rehabilitation device.

Specific exemplary embodiments of the invention are explained in more detail in the following description, with reference to the appended figures. Specific features of these exemplary embodiments—if appropriate, also considered individually or in further combinations—can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
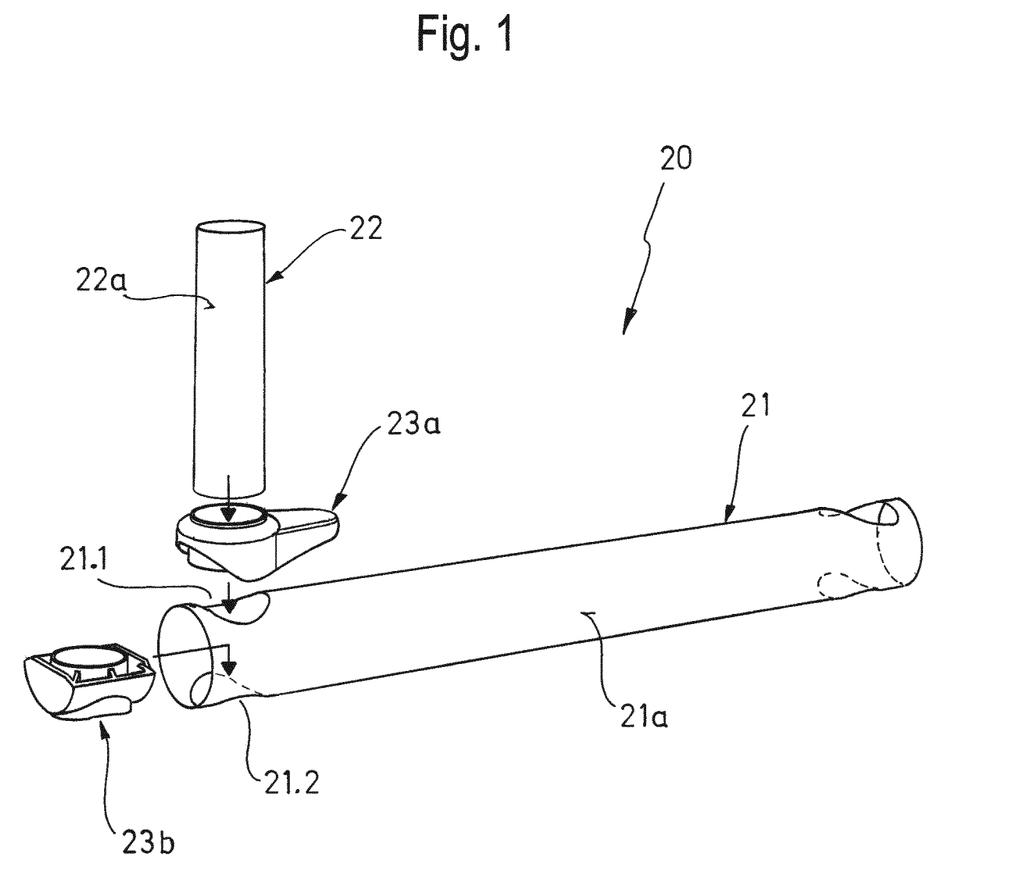
FIG. 1 depicts an exploded view of a first and a second tube piece, as well as of a first and a second connection element of an embodiment of the robot structure.

FIG. 1 shows a representative link 20 of a robot structure comprising several links and joints connecting these links to one another.

This link 20 includes a first tube piece 21 comprising a first jacket outer wall 21a and a second tube piece 22 comprising a second jacket outer wall 22b, wherein the second tube piece 22 is arranged, with its longitudinal extent at an angle to the longitudinal extent of the first tube piece 21, as shown in FIG. 1 through FIG. 5, in such a way that the second tube piece 22 is inserted into two, opposite tube cutouts 21.1, 21.2 of the first tube piece 21, and the second tube piece 22 thereby passes through the first jacket outer wall 21a of the first tube piece 21 at opposite sides.

The second tube piece 22 is rigidly connected to the first tube piece 21 by means of a first connection element 23a and a second connection element 23b.

Figure 2:
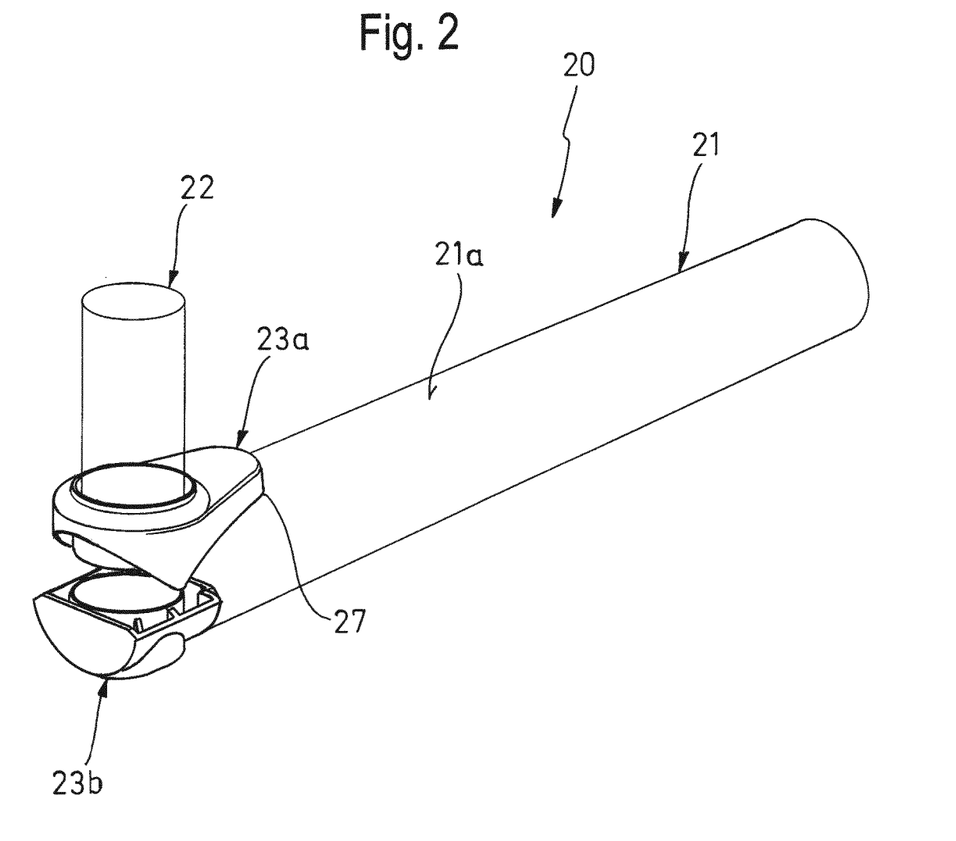
FIG. 2 depicts the first and the second tube pieces, as well as the first and the second connection elements of the robot structure according to FIG. 1, in an assembly.
Figure 3:
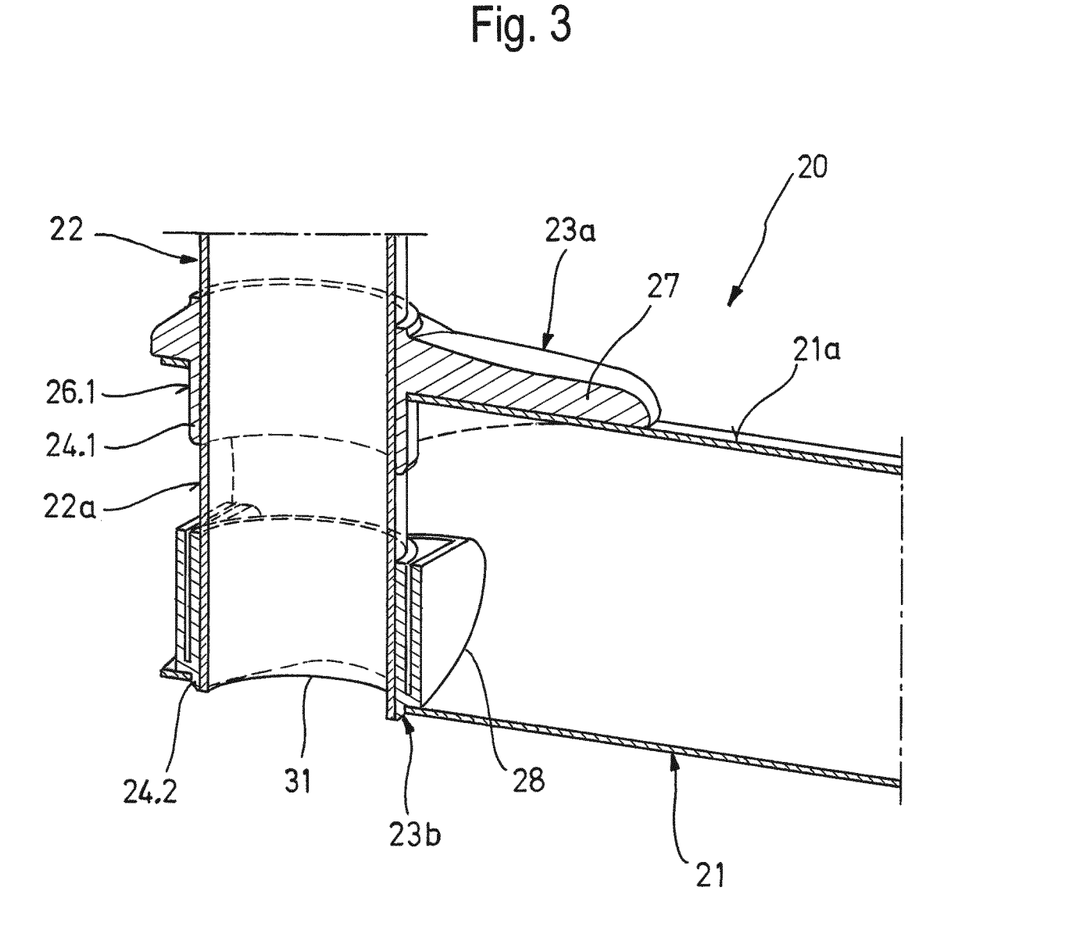
FIG. 3 is a sectional view through the first and the second tube pieces in the region of the first and the second connection elements.
Figure 6:
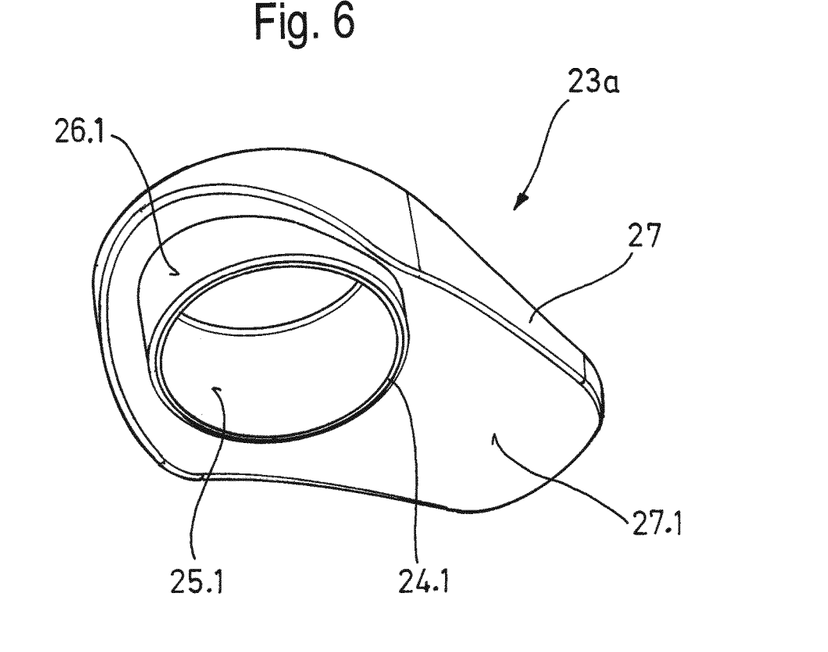
FIG. 6 is a perspectival view of the first connection element by itself.

As shown in particular in FIG. 6, the first connection element 23a comprises a first ring section 24.1, which abuts with its first ring inner jacket wall 25.1 flush against the second jacket outer wall 22a of the second tube piece 22 and abuts with its first ring outer jacket wall 26.1 flush against a first cutout edge of the one tube cutout 21.1 of the first tube piece 21, and the first connection element 23a comprises a tab section 27, which adjoins the first ring section 24.1 and extends with its longitudinal extent along the longitudinal extent of the first tube piece 21 while abutting flush against the first jacket outer wall 21a thereof, as can be seen in particular in FIG. 2 and FIG. 3.

Figure 7:
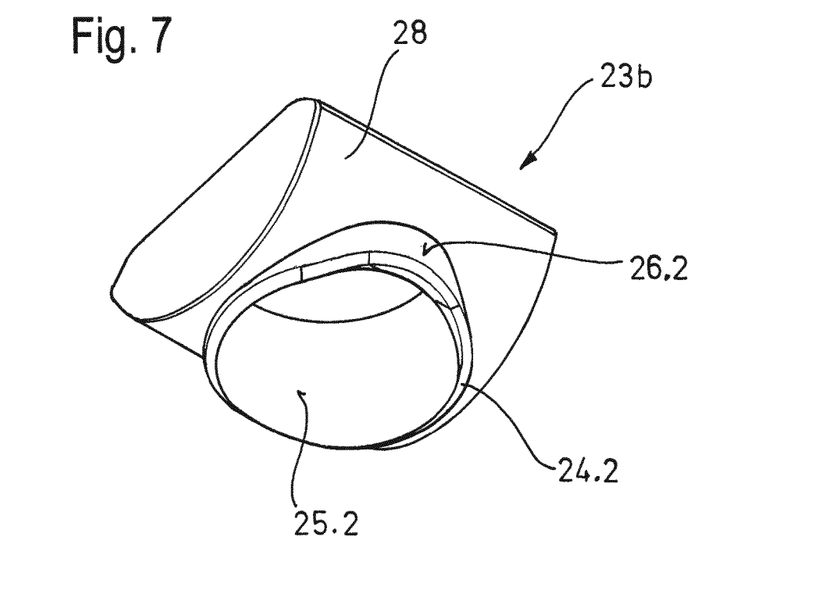
FIG. 7 is a perspectival view of the second connection element by itself.
Figure 8:
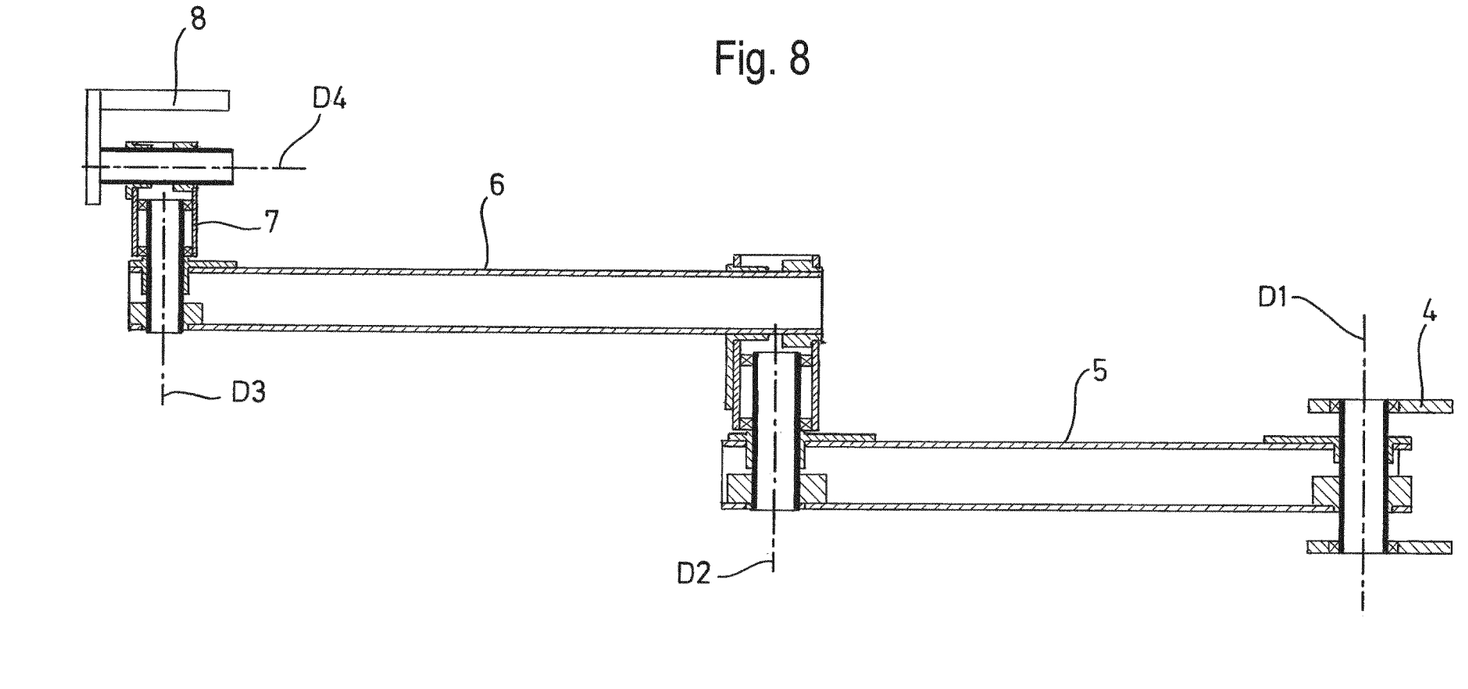
FIG. 8 depicts a first embodiment variant of a robot structure with several joints and links, which are designed inventively.
Figure 9:
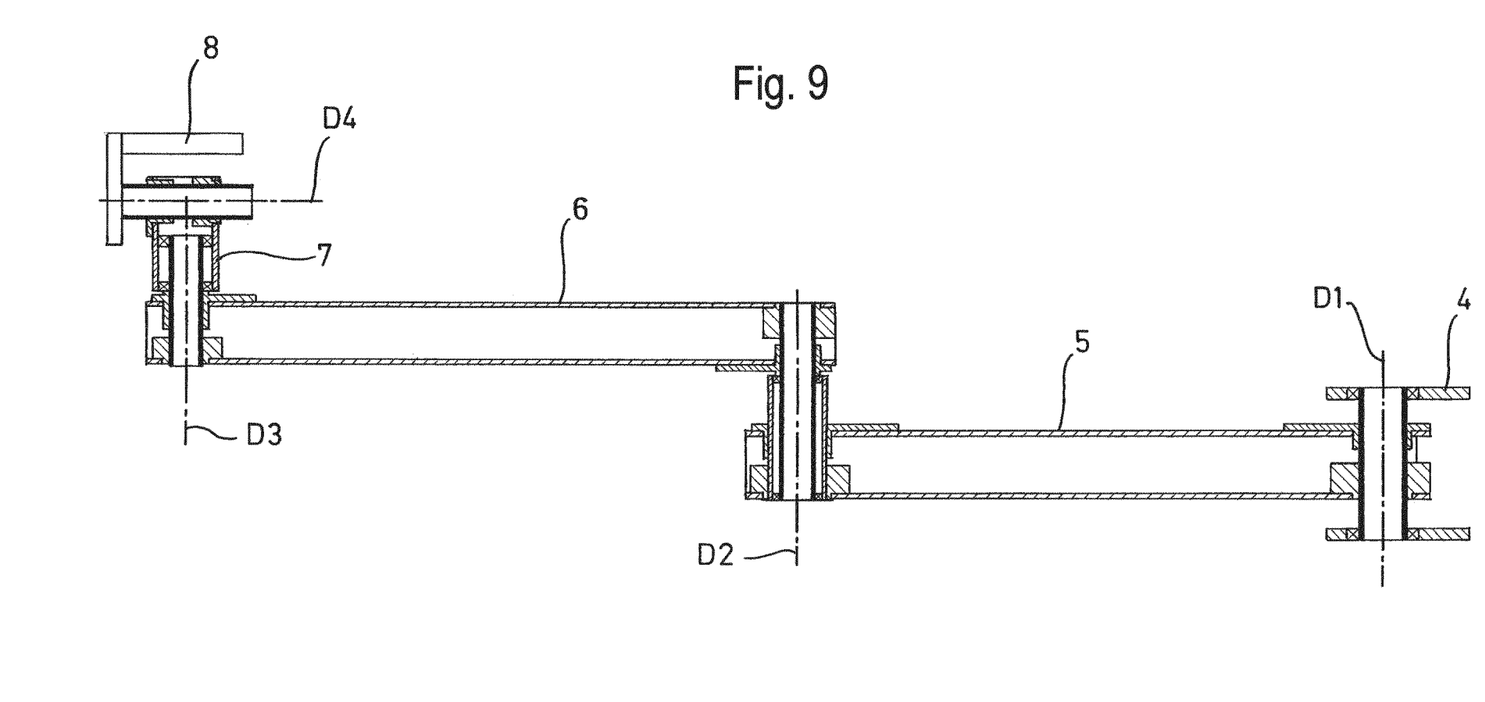
FIG. 9 depicts a second embodiment variant of a robot structure with several joints and links, which are designed inventively.

As shown in particular in FIG. 7, the second connection element 23b comprises a second ring section 24.2, which abuts with its second ring inner jacket wall 25.2 flush against the second jacket outer wall 22a of the second tube piece 22 and abuts with its second ring outer jacket wall 26.2 flush against a second cutout edge of the other tube section 21.2 of the first tube piece 21, and the second connection element 23b comprises a cylinder jacket section 28, which adjoins the second ring section 24.2 and abuts flush against an inner wall of the first tube piece 21.

In the case of the present exemplary embodiments, the second tube piece 22 is inserted with its longitudinal extent at a right angle to the longitudinal extent of the first tube piece 21 into the first tube piece 21, so that the second tube piece 22 is arranged perpendicularly to the first tube piece 21.

In the case of the present exemplary embodiments, the first connection element 23a and/or the second connection element 23b are each designed as a one-piece, plastic injection-molded body or as a 3-D-printed plastic body.

The first connection element 23a is connected to the first tube piece 21 in that an inner surface 27.1 (FIG. 6), facing the first tube piece 21, of the tab section 27 of the first connection element 23a is adhesively bonded to the first jacket outer wall 21a of the first tube piece 21 in the case of the present exemplary embodiments.

The second connection element 23b is connected to the first tube piece 21 in that the cylinder jacket section 28, facing the first tube piece 21, of the second connection element 23b is adhesively bonded to the inner wall of the first tube piece 21.

The first connection element 23a can optionally be connected to the second tube piece 22 in that the first ring inner jacket wall 25.1, facing the second tube piece 22, of the first ring section 24.1 of the first connection element 23a is adhesively bonded or compression-molded to the second jacket outer wall 22a of the second tube piece 22.

The second connection element 23b can optionally be connected to the second tube piece 22 in that the second ring inner jacket wall 25.2, facing the second tube piece 22, of the second ring section 24.2 of the second connection element 23b is adhesively bonded or compression-molded to the second jacket outer wall 22a of the second tube piece 22.

The tab section 27 of the first connection element 23a extends in the longitudinal extent of the first tube piece 21 over a minimum length equal to or greater than the width—in particular, the diameter—of the second tube piece 22.

In the case of the present exemplary embodiments, the first tube piece 21 and the second tube piece 22 each comprise a circular cross-section. The tab section 27 of the first connection element 23a extends transversely to the longitudinal extent of the first tube piece 21 over a circumferential arc of the first tube piece 21, which extends around the first tube piece 21 at an angle of between 90 and 180 degrees—here, about 120 degrees, as can be seen in particular in FIG. 5.

The first ring section 24.1 of the first connection element 23a comprises, at least at the height of the first cutout edge of the one tube cutout 21.1, an at least largely constant wall thickness, which is on average between 0.5 and 2.0 millimeters. The second ring section 24.2 of the second connection element 23b also comprises, at least at the height of the second cutout edge of the other tube cutout 21.2, an at least largely constant wall thickness, which is on average between 0.5 and 2.0 millimeters.

Figure 4:
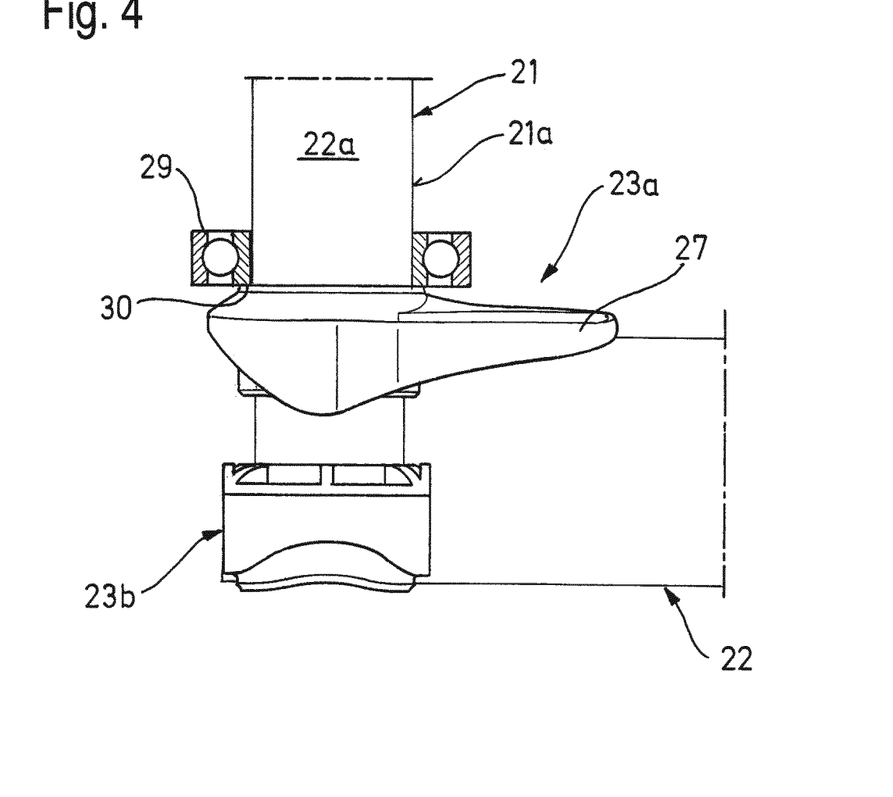
FIG. 4 is a lateral side view of the first and the second tube pieces, as well as of the first and the second connection elements of the robot structure according to FIG. 1, in an assembly.
Figure 5:
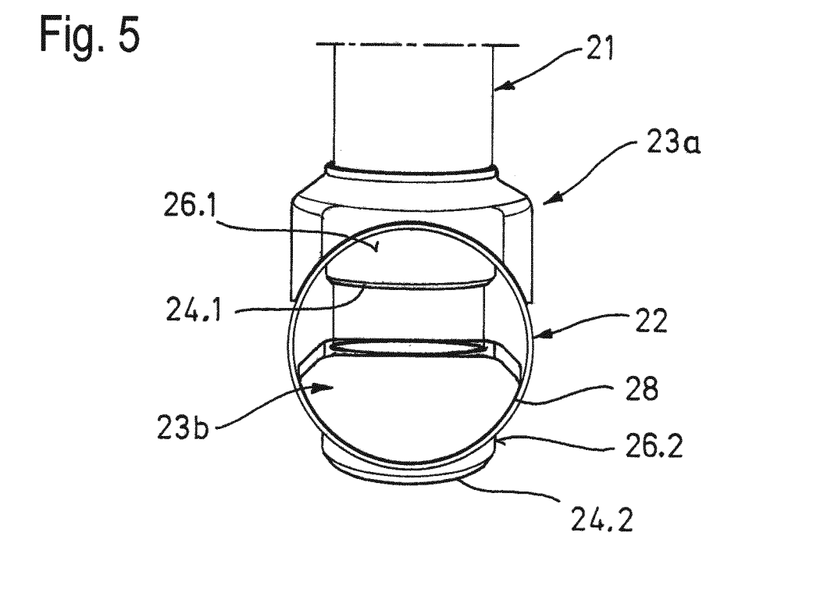
FIG. 5 is a frontal side view of the first and the second tube pieces, as well as of the first and the second connection elements of the robot structure according to FIG. 1, in an assembly.

As indicated in FIG. 4 by the rolling bearing 29, the first connection element 23a comprises a first rolling bearing seat 30, which is designed to carry an inner ring of the rolling bearing 29 of the robot structure in a rotationally-fixed manner.

As shown in FIG. 3, the second tube piece 22 may comprise, in its tube wall, at least one passage opening 31, which is arranged in the longitudinal extent of the second tube piece 22 at a height located between the first connection element 23a and the second connection element 23b, wherein the passage opening 31 is designed for an electrical line to be passed through between a first cavity of the first tube piece 21 and a second cavity of the second tube piece 22.

Exemplary basic embodiments of an inventive rehabilitation device 1 are shown in FIG. 8 through FIG. 12. The respective rehabilitation device 1 comprises a stand 2; a lifting column 3 fastened to the stand 2; a lifting carriage 4 mounted in a height-adjustable manner on the lifting column 3 and automatically height-adjustable by means of a first drive of the rehabilitation device 1; a base arm 5 mounted on the lifting carriage 4 pivotably about a first, vertical axis of rotation D1 and pivotable about the first, vertical axis of rotation D1 in an automatically-driven manner by means of a second drive of the rehabilitation device 1; a forearm 6 mounted on the base arm 5 pivotably about a second, vertical axis of rotation D2 and pivotable about the second, vertical axis of rotation D2 in an automatically-driven manner by means of a third drive of the rehabilitation device 1; a connection piece 7 mounted on the forearm 6 freely rotatably about a third, vertical axis of rotation D3 in a non-driven manner; and a body part support 8 mounted on the connection piece 7 tiltably about a fourth, horizontal axis of rotation D4.

Figure 10:
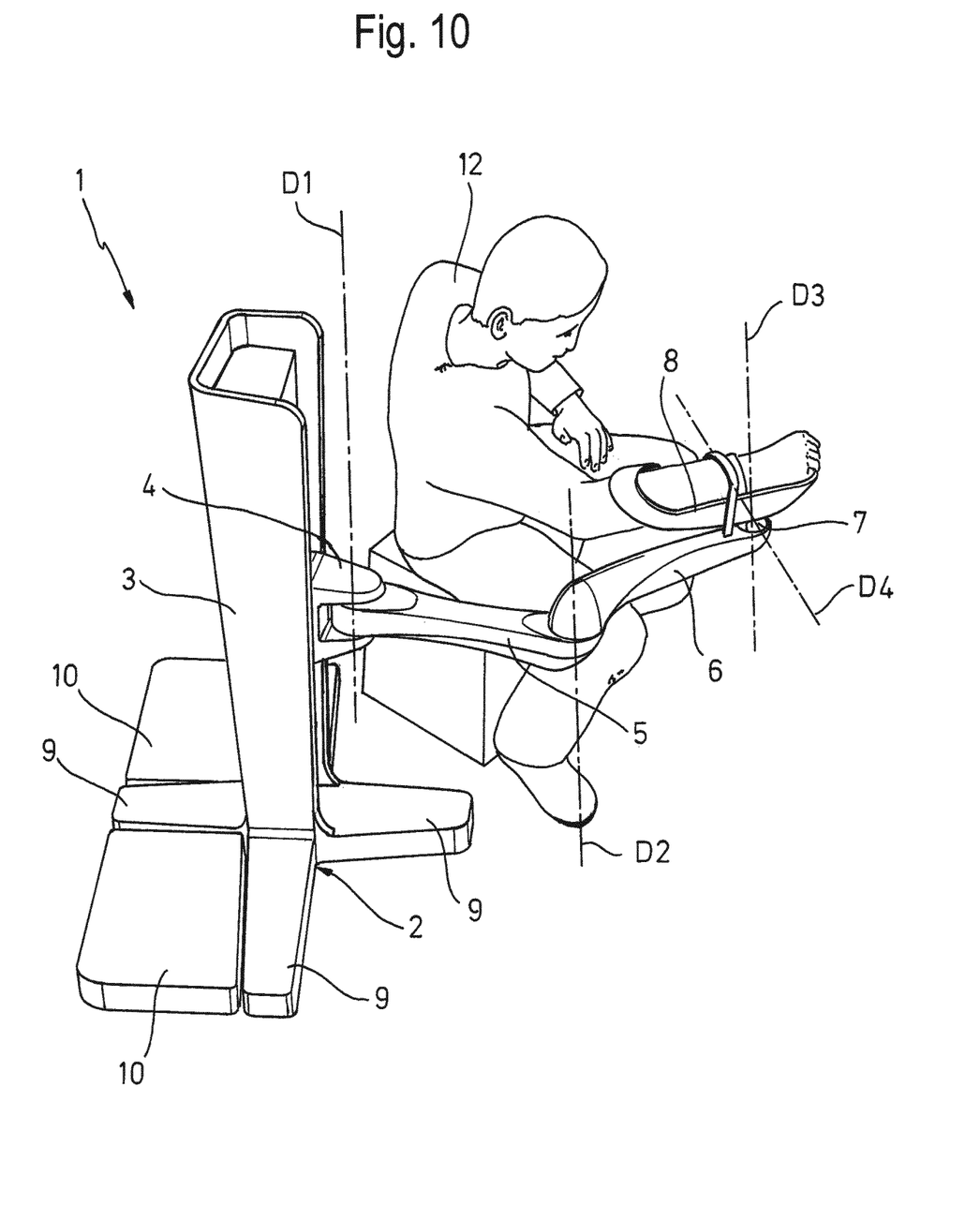
FIG. 10 is a perspective view of a rehabilitation device, which may comprise an inventive robot structure, in use on a person.
Figure 11:
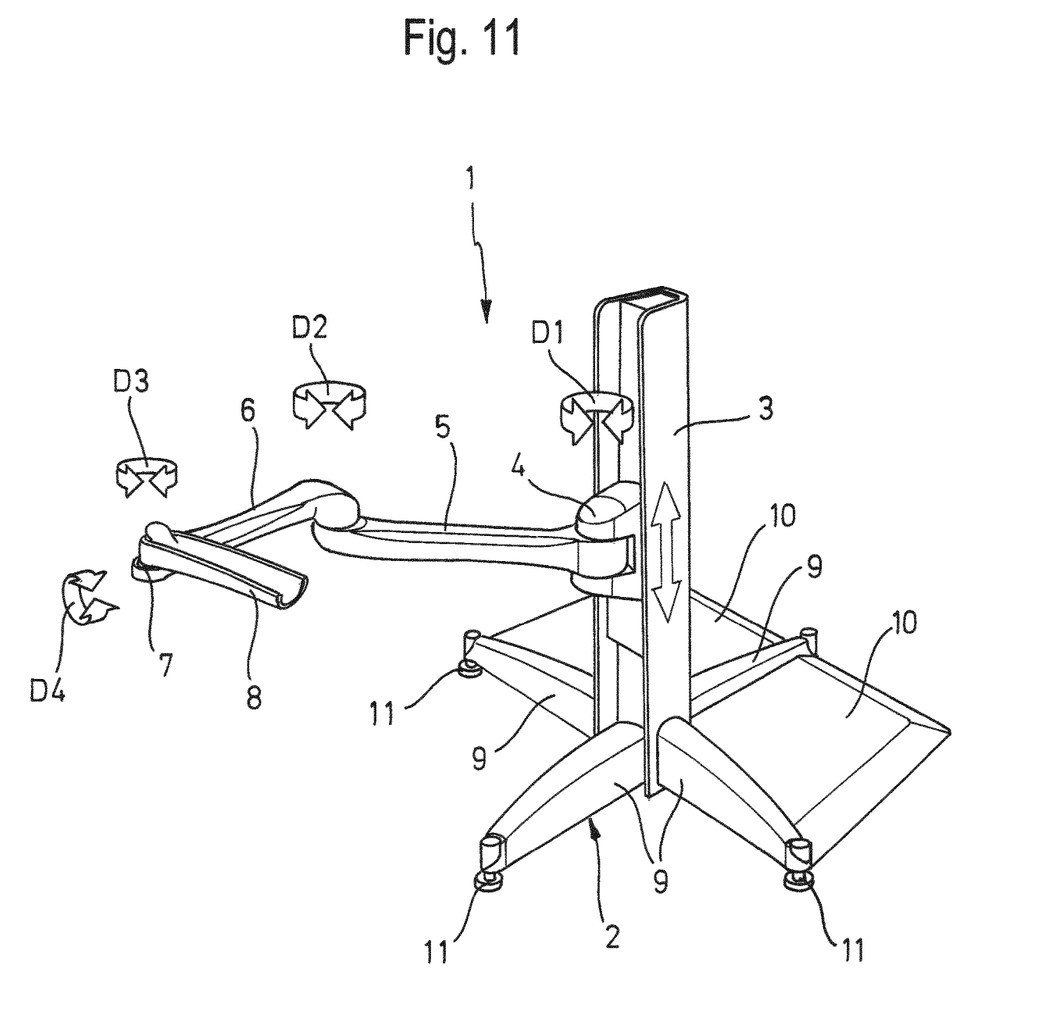
FIG. 11 is a perspective view of the rehabilitation device by itself.

The stand 2 comprises stand legs 9—four stand legs 9 in the case of the present exemplary embodiment of FIG. 10 and FIG. 11. As shown, weights 10 can be attached to the stand legs 9 in order to increase the stability, i.e., the steadiness, of the rehabilitation device 1. The stand legs 9 can optionally be provided with stand feet 11, as shown in FIG. 11. Instead of stand feet 11, it is also possible to provide rollers, which allow the rehabilitation device 1 to be easily moved manually. The rollers can be braked.

Figure 12:
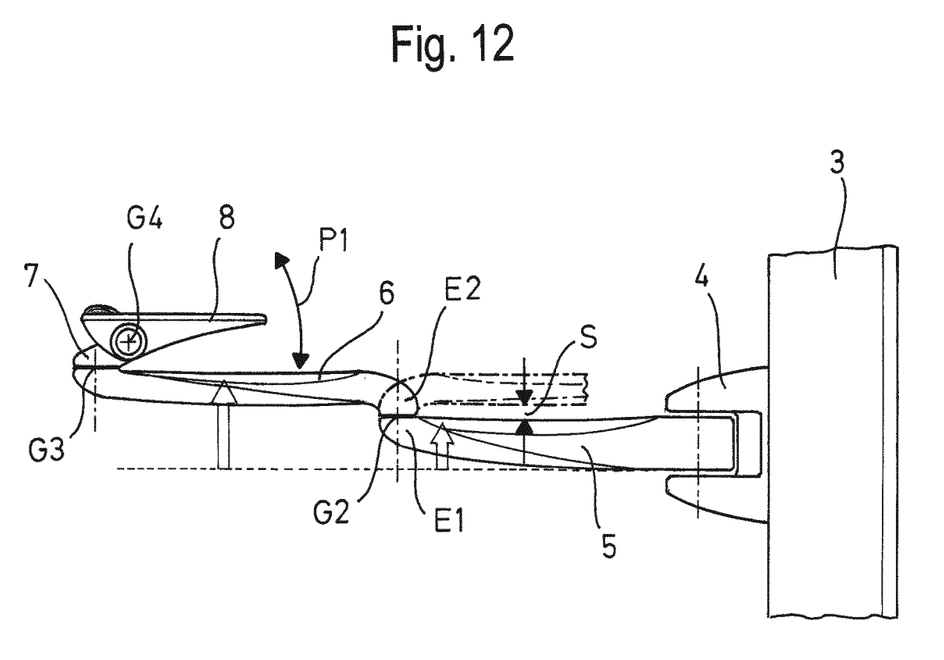
FIG. 12 is a side view of the rehabilitation device according to FIG. 10 or FIG. 11.

In the case of the present exemplary embodiment of FIG. 10 through FIG. 12, the body part support 8 is designed as a lower arm support, on which a lower arm of a person 12 is strapped down.

FIG. 12 once again shows the degrees of freedom of rehabilitation device 1 in a somewhat modified embodiment of the rehabilitation device 1. In this case, the rehabilitation device 1 also comprises a stand 2; a lifting column 3 fastened to the stand 2; a lifting carriage 4 mounted in a height-adjustable manner on the lifting column 3 and automatically height-adjustable by means of a first drive of the rehabilitation device 1; a base arm 5 mounted on the lifting carriage 4 pivotably about a first, vertical axis of rotation D1 and pivotable about the first, vertical axis of rotation D1 in an automatically-driven manner by means of a second drive of the rehabilitation device 1; a forearm 6 mounted on the base arm 5 pivotably about a second, vertical axis of rotation D2 and pivotable about the second, vertical axis of rotation D2 in an automatically-driven manner by means of a third drive of the rehabilitation device 1; a connection piece 7 mounted on the forearm 6 freely rotatably about a third, vertical axis of rotation D3 in a non-driven manner; and a body part support 8 mounted on the connection piece 7 tiltably about a fourth, horizontal axis of rotation D4.

As can in particular be seen in FIG. 12, the forearm 6 is mounted on the base arm 5 pivotally about the second axis of rotation D2 by means of a second joint G2, wherein the second joint G2 is designed to keep the forearm 6 above the base arm 5 in all pivoting positions of the forearm 6, wherein the connection piece 7 is mounted on the forearm 6 pivotably about the third axis of rotation D3 by means of a third joint G3, wherein the third joint G3 is designed to keep the connection piece 7 above the forearm 6 in all pivoting positions of the connection piece 7, the body part support 8 being mounted on the connection piece 7 tiltably (arrow P1) about the fourth axis of rotation D4 by means of a fourth joint G4, wherein the fourth joint G4 is designed to keep the body part support 8 above the forearm 6 in all pivoting positions of the body part support 8.

FIG. 12 also shows how a distal end section E1 of the base arm 5 and/or a proximal end section E2 of the forearm 6, at which transition the end sections E1 and E2, the second axis of rotation D2 is arranged, can be angled in such a way that, in a relative position of base arm 5 and forearm 6 arranged one above the other, as shown in FIG. 3, a gap space S acting as an anti-pinch protection is formed between the base arm 5 and the folded-in forearm 6 shown in dashed lines.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot structure, comprising:
    a plurality of links and respective joints connecting the links to one another;
    at least one link of the plurality of links comprising a first tube piece which includes a first jacket outer wall, and a second tube piece which includes a second jacket outer wall;
    wherein the second tube piece is arranged with its longitudinal extent inclined at an angle to the longitudinal extent of the first tube piece such that the second tube piece is inserted into two oppositely disposed tube cutouts in the first tube piece, whereby the second tube piece passes through the first jacket outer wall of the first tube piece at opposite sides;
    the second tube piece rigidly connected to the first tube piece by a first connection element and a second connection element;
    the first connection element comprising a first ring section having a first ring inner jacket wall that abuts flush against the second jacket outer wall of the second tube piece, and having a first ring outer jacket wall that abuts flush against a first cutout edge of one of the tube cutouts of the first tube piece;
    the first connection element further comprising a tab section which adjoins the first ring section and extends with its longitudinal extent aligned with the longitudinal extent of the first tube piece and abutting flush against the first jacket outer wall of the first tube piece;
    the second connection element comprising a second ring section having a second ring inner jacket wall that abuts flush against the second jacket outer wall of the second tube piece, and having a second ring outer jacket wall that abuts flush against a second cutout edge of the other one of the tube cutouts of the first tube piece; and
    the second connection element further comprising a cylinder jacket section that adjoins the second ring section and abuts flush against an inner wall of the first tube piece.

2. The robot structure of claim 1, wherein the second tube piece is inserted into the first tube piece with its longitudinal extent at a right angle to the longitudinal extent of the first tube piece, such that the second tube piece is arranged perpendicularly to the first tube piece.

3. The robot structure of claim 1, wherein at least one of the first connection element or the second connection element is configured as a one-piece plastic body.

4. The robot structure of claim 1, wherein the first connection element is connected to the first tube piece by an adhesive bond or a cohesive connection between an inner surface of the tab section that faces the first tube piece and the first jacket outer wall of the first tube piece.

5. The robot structure of claim 1, wherein the second connection element is connected to the first tube piece by an adhesive bond between the cylinder jacket section that faces the first tube piece and the inner wall of the first tube piece.

6. The robot structure of claim 1, wherein the first connection element is connected to the second tube piece by one of:
    an adhesive bond between the first ring inner jacket wall of the first ring section, which faces the second tube piece, and the second jacket outer wall of the second tube piece; or
    a compression-molded connection between the first ring inner jacket wall of the first ring section, which faces the second tube piece, and the second jacket outer wall of the second tube piece.

7. The robot structure of claim 1, wherein the second connection element is connected to the second tube piece by one of:
- an adhesive bond between the second ring inner jacket wall of the second ring section, which faces the second tube piece, and the second jacket outer wall of the second tube piece; or
- a compression-molded connection between the second ring inner jacket wall of the second ring section, which faces the second tube piece, and the second jacket outer wall of the second tube piece.

8. The robot structure of claim 1, wherein the tab section of the first connection element extends along the longitudinal extent of the first tube piece over a minimum length that is equal to or greater than the width of the second tube piece.

9. The robot structure of claim 8, wherein the minimum length is equal to or greater than a diameter of the second tube piece.

10. The robot structure of claim 1, wherein at least one of:
- at least one of the first tube piece or the second tube piece comprises a circular cross-section; or
- the tab section of the first connection element extends transversely to the longitudinal extent of the first tube piece over a circumferential arc of the first tube piece which extends at an angle of between about 90 degrees and about 180 degrees, inclusive, around the first tube piece.

11. The robot structure of claim 1, wherein:
- the first ring section of the first connection element comprises, at least at the height of the first cutout edge of the one tube cutout, an at least largely constant wall thickness; and
- the second ring section of the second connection element comprises, at least at the height of the second cutout edge of the other tube cutout, an at least largely constant wall thickness;
- the wall thicknesses of the first ring section and the second ring section being on average between about 0.5 millimeters and about 2.0 millimeters, inclusive.

12. The robot structure of claim 1, wherein:
at least one of:
- the first connection element comprises a first drive-element seat, or
- the second connection element comprises a second drive-element seat; and
- each of the first and second drive-element seats is configured to carry a drive element of the robot structure in a rotationally-fixed manner.

13. The robot structure of claim 1, wherein:
at least one of:
- the first connection element comprises a first rolling bearing seat, or
- the second connection element comprises a second rolling bearing seat; and
- each of the first and second rolling bearing seats is configured to carry an inner ring of a rolling bearing of the robot structure in a rotationally-fixed manner.

14. The robot structure of claim 1, wherein:
- the second tube piece comprises at least one passage opening in its tube wall, the passage opening aligned with the longitudinal extent of the second tube piece at a height located between the first connection element and the second connection element; and
- the passage opening is configured for an electrical line to be passed through between a first cavity of the first tube piece and a second cavity of the second tube piece.

15. A rehabilitation device, comprising:
- a stand;
- a lifting column fastened to the stand;
- a lifting carriage mounted in a height-adjustable manner on the lifting column and automatically height-adjustable by a first drive;
- a base arm pivotably mounted on the lifting carriage about a first, vertical axis of rotation, and pivotably movable about the first, vertical axis of rotation in an automatically-driven manner by a second drive;
- a forearm pivotably mounted on the base arm about a second, vertical axis of rotation, and pivotably movable about the second, vertical axis of rotation in an automatically-driven manner by a third drive;
- a connection piece mounted on the forearm and freely rotatable about a third, vertical axis of rotation; and
- a body part support mounted on the connection piece and tiltably movable about a fourth, horizontal axis of rotation;
- wherein at least the base arm, the forearm, and the connection piece are configured as a robot structure according to claim 1.

16. The rehabilitation device of claim 15, wherein:
- the forearm is pivotally mounted on the base arm about the second axis of rotation by a first joint;
- the first joint is configured to keep the forearm above the base arm in all pivoting positions of the forearm;
- the connection piece is pivotally mounted on the forearm about the third axis of rotation by a second joint;
- the second joint is configured to keep the connection piece above the forearm in all pivoting positions of the connection piece;
- the body part support is tiltably mounted on the connection piece about the fourth axis of rotation by a third joint; and
- the third joint is configured to keep the body part support above the forearm in all pivoting positions of the body part support.

* * * * *